United States Patent [11] 3,601,968

| | | | | |
|---|---|---|---|---|
| [72] | Inventor | Armin Wirz<br>Dietlikon, Switzerland | | |
| [21] | Appl. No. | 882,875 | | |
| [22] | Filed | Dec. 8, 1969 | | |
| [45] | Patented | Aug. 31, 1971 | | |
| [73] | Assignee | Rieter Machine Works Ltd. | | |
| [32] | Priority | Dec. 13, 1968 | | |
| [33] | | Switzerland | | |
| [31] | | 18,585/68 | | |

[54] ELECTRICALLY HEATED, UNILATERALLY SUPPORTED DRAWROLL HAVING COOLING MEANS
8 Claims, 3 Drawing Figs.

[52] U.S. Cl. .................................. 57/34,
219/10.61
[51] Int. Cl. ..................................... D01h 13/28,
H05b 1/00
[50] Field of Search ........................................ 57/34, 36,
55.5, 34 HS, 157 TS, 157 MS; 28/62, 71.3;
219/10.61, 469

[56] References Cited
UNITED STATES PATENTS

| | | | |
|---|---|---|---|
| 2,336,019 | 12/1943 | Kline et al. .................... | 28/62 UX |
| 2,777,931 | 1/1957 | Bundegaard et al. ......... | 28/62 UX |
| 2,834,860 | 5/1958 | Clairborne et al. ............ | 28/62 UX |
| 2,921,358 | 1/1960 | Cox et al. ...................... | 28/62 X |
| 3,159,964 | 12/1964 | Kretsch ........................ | 57/55.5 X |
| 3,187,150 | 6/1965 | France ......................... | 219/10.61 X |
| 3,200,230 | 8/1965 | Bretoniere ................... | 219/10.61 X |
| 3,286,081 | 11/1966 | Scowcroft .................... | 219/469 X |
| 3,417,447 | 12/1968 | Trifunovic et al. ........... | 28/71.3 |
| 3,461,657 | 8/1969 | Scragg et al. ................. | 57/34 |
| 3,463,893 | 8/1969 | Chifu ............................ | 219/10.61 |

*Primary Examiner* — Donald E. Watkins
*Attorney* — Werner W. Kleeman

ABSTRACT: A drawroll is disclosed for use with a drawtwisting or draw-winding machine or the like, supported upon one end of a rotating shaft which is rotatably mounted at its other end in a suitable bearing, and having electrical heating means within the drawroll. The heating means is rigidly secured to the machine frame by a hollow supporting tube surrounding the shaft; a fan means is disposed within the tube to draw cooling air along the shaft and expel it through radial openings adjacent the heating means. A hood may be provided externally of the supporting tube to enclose the space extending axially from the machine frame to the heating means.

PATENTED AUG 31 1971   3,601,968

INVENTOR
ARMIN WIRZ
BY
ATTORNEYS.

ELECTRICALLY HEATED, UNILATERALLY SUPPORTED DRAWROLL HAVING COOLING MEANS

BACKGROUND OF THE INVENTION

The invention concerns an electrically heated, unilaterally supported drawroll provided with a cooling zone for drawtwisting, draw-winding and spin-draw-winding machines.

Electrically heated drawrolls are known for heating endless filaments, before drawing, to the temperature needed for relaxing or setting. The heat in most cases is generated by induction or resistance heating. The drawroll shaft, and as a result the bearings themselves, of such known drawrolls, were exposed to such heat that the lubricating properties of the lubricants used were heavily impaired, and the bearings were therefore frequently damaged. Proposed solutions, however, aimed at elimination of undesirable heat transfer to the drive shaft and to the drawroll bearings, are known. In one arrangement proposed for this purpose, a drawroll was provided having its cylindrical portion made from a heat conductive material and its front faceplate made from a material not conducting heat in order to prevent the heat from draining into the drawroll shaft. This arrangement presents not only the disadvantage that manufacturing the roll is difficult, but also that the drive shaft is insufficiently shielded against heat and the shaft thus is heated considerably. Furthermore a heated drawroll is known the heating zone of which adjacent to the roll face, i.e. the zone of the highest temperature, is designed open and the backwall of which is provided with openings in order to reduce the heat flow. The heating device of the drawroll in this arrangement still being located in the vicinity of the bearings of the roll, and the heat flow through the backwall to the bearing housing reduced by the openings still can cause undue heating of the bearing and the lubricating action thus can be impaired.

In a further known arrangement, in which heat transfer is to be prevented from reaching the bearings of the heated, unilaterally supported drawroll, a drawroll cylinder is used, both face sides of which are open and provided with wing-shaped spokes. Furthermore a ring-shaped duct is provided for guiding the air around the drive shaft. The cooling air enters via holes provided in the circumference of the supporting plate of the drawroll, flows through the ring-shaped duct and escapes via the drawroll housing face zone. Cooling of the shaft is attempted by circulation of cooling air which carries off the heat radiated towards the inside. In this arrangement an undesirable airflow through the roll inside occurs, carrying off part of the heat generated by the heating device. In order to make up this heat loss, the heating device must consume more energy. A further disadvantage of this arrangement is the high manufacturing cost.

SUMMARY OF THE INVENTION

It is the goal of the present invention to eliminate the disadvantages mentioned above and specifically to achieve cooling of the bearings, keeping design complications to a minimum. This goal is achieved using an electrically heated, unilaterally supported drawroll for drawtwisting, draw-winding or spin-draw-winding machines, provided with a cooling zone, in the interior space of which roll a heating device concentric with the axis of rotation and rigidly mounted to the machine frame is provided in such manner that the cooling zone provided between the heating device and a bearing contains a rotor generating a suction airstream and expelling the airstream radially.

BRIEF DESCRIPTION OF THE DRAWINGS

The invention is described in more detail in the following with reference to illustrated embodiments. It is shown in.

DETAILED DESCRIPTION OF THE INVENTION

Figure 1:
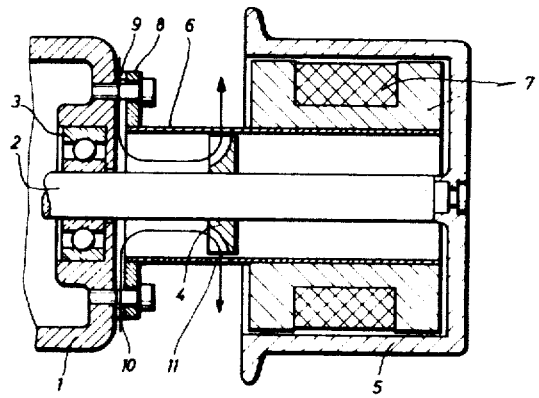
FIG. 1, a longitudinal section of a drawroll according to the invention.

In FIG. 1 a first embodiment of the invention is shown, in which a drive motor (not shown) is flanged to a bearing housing 1. On a shaft 2 rotatably supported in the bearing housing 1 by a ball bearing 3 a fan blade wheel 4 acting as a fan rotor means and a drawroll 5 are rigidly mounted for rotation therewith. A flange 8 of a supporting tube 6 supporting a heating device 7 is threadedly secured to the bearing housing so that the heating device is rigidly secured to the machine frame within and substantially coaxial with the drawroll 5.

Flange 8 is provided with projections 9 serving to space the flange from the housing, keeping openings 10 free between housing 1 and flange 8. In order to permit the air circulation needed, perforations 11 are provided in the supporting tube 6 in the zone facing the fan blade wheel 4 and preferably in the radial plane of the fan blade wheel. It will be noted that in this manner, a cooling zone is formed between the drawroll 5 and the bearing housing 1.

Figure 2:
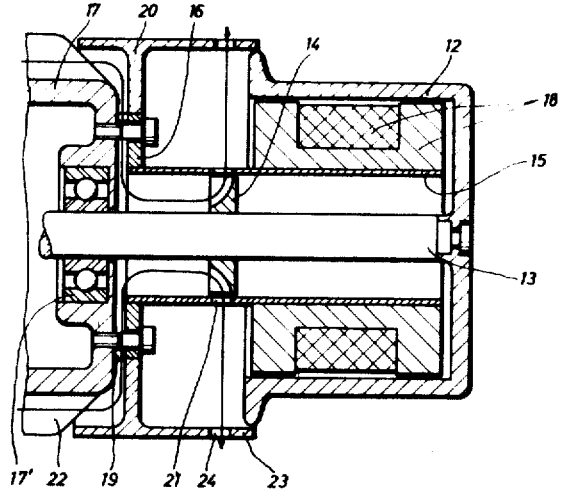
FIG. 2, an alternative embodiment of the drawroll shown in FIG. 1.

In FIG. 2 a somewhat differing embodiment is shown, a drawroll 12 being mounted directly onto a motor shaft 13. A fan blade wheel 14 also is mounted onto this motor shaft 13. A heating device 18 is mounted onto a supporting tube 15, a flange 16 of which tube is screwed to a motor housing 17 containing an antifriction bearing 17'. Air suction openings 19 are formed by means of projections 20 between the flange 16 and the motor housing 17. In order to let the cooling air escape, radial openings 21 are provided along the circumference of the supporting tube in the zone facing the fan blade wheel 14. The cooling air itself is transported by a motor fan (not shown) along ribs 22 and flange 16 via the supporting tube 15 into a hood 23, the surface of which also is provided, like the supporting tube 15, with radial openings 24 in order to let the cooling air escape to the outside.

Figure 3:
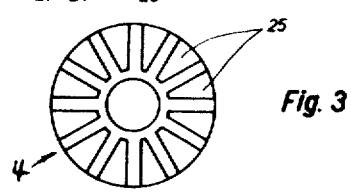
FIG. 3, a top view of a fan blade wheel.

The fan blade wheel 4 shown in FIG. 3, which can be used in both embodiments described, is provided with recesses 25 extending radially from the inside towards the circumference. Said wheel should preferably be made from a heat conductive material. In either event, the radial openings 11 or 21 are preferably disposed adjacent the heating device.

The function of the devices according to the invention is described shortly in the following. The shaft (2, 13) is driven by a motor (not shown). The drawroll (5, 12) and the fan blade wheel (4, 14) rotate at the same speed as the drawroll shaft. Air from the outside is sucked in via the openings (9, 19) by the fan and escapes, after flowing along the shaft (2, 13), via the openings (11, 21, 24) to the outside space. In the embodiment shown in FIG. 2, cooling air forced along ribs 22 is guided into the suitably shaped hood 23 and through the openings 19.

It is believed evident that by providing a drawroll according to the construction described above, all of the objects set forth in the introduction to the specification have been successfully fulfilled.

Accordingly what is claimed is:

1. In combination, an electrically heated, unilaterally supported drawroll for drawtwisting, draw-winding, or spin-draw-winding machines or the like, a shaft rigidly secured to said drawroll and rotatably supported within a bearing housing secured to the machine frame and axially spaced from said drawroll, a heating device within the interior of said drawroll and concentric with the axis of rotation of said drawroll, said heating device being rigidly secured to the machine frame adjacent said bearing housing, a cooling zone defined between said heating device and said bearing housing, and a fan rotor means within said cooling zone adapted to draw cooling air through said cooling zone and expel the cooling air radially.

2. The combination as defined in claim 1, further comprising a supporting tube securing said heating device to the machine frame, said fan rotor means drawing the cooling air through said supporting tube along said shaft, said supporting tube having a plurality of openings through which the air is expelled radially.

3. The combination as defined in claim 2, further comprising a flange member securing said supporting tube to the machine frame, said flange member being spaced from the machine frame to permit entry of cooling air therebetween.

4. The combination as defined in claim 3, further comprising a hood member extending axially from said flange member and substantially surrounding said supporting tube between said flange member and said drawroll, thereby defining an enclosed space between the machine frame and said drawroll.

5. The combination as defined in claim 4, wherein said hood member comprises a plurality of openings through which the cooling air is exhausted.

6. The combination as defined in claim 2, wherein said openings in said supporting tube lie substantially in the radial plane of said rotor means.

7. The combination as defined in claim 6, wherein said openings are disposed adjacent said heating device.

8. The combination as defined in claim 1, wherein said rotor means comprises a heat-conductive material and is provided with a plurality of radially extending recesses in the surface thereof.